E. W. OWENS.
CHECK ROWER AND AUTOMATIC CORN PLANTER.
APPLICATION FILED SEPT. 3, 1912.
1,090,167.  Patented Mar. 17, 1914.
4 SHEETS—SHEET 2.
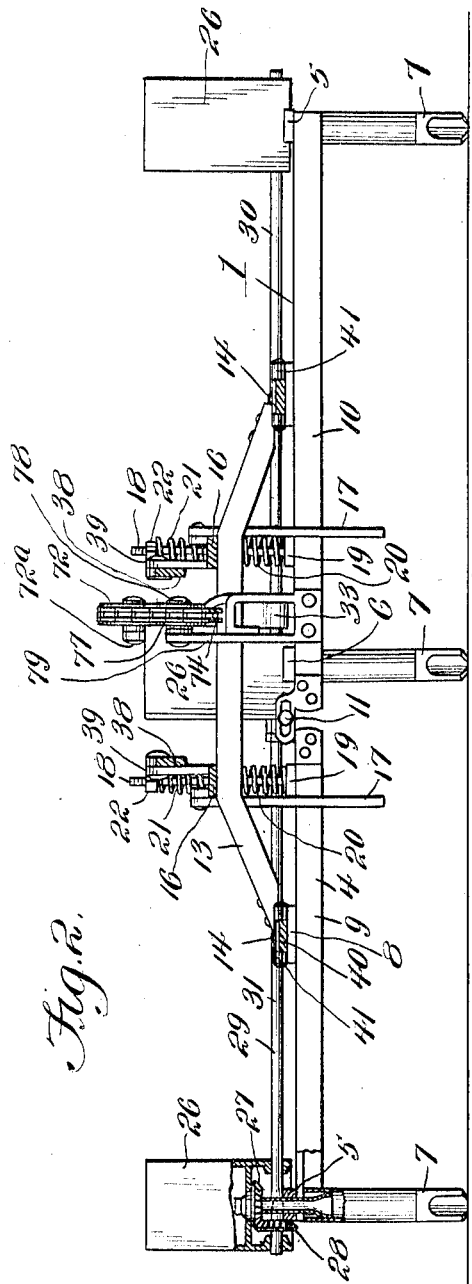
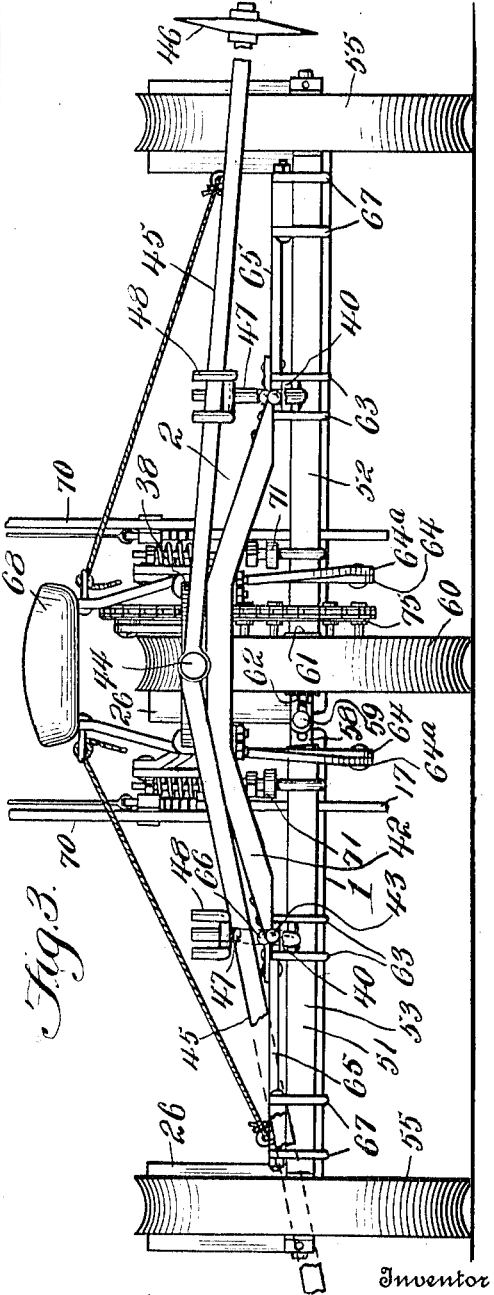
Witnesses
J. T. L. Wright
J. W. Garner
Inventor
Edward W. Owens
By Victor J. Evans
Attorney

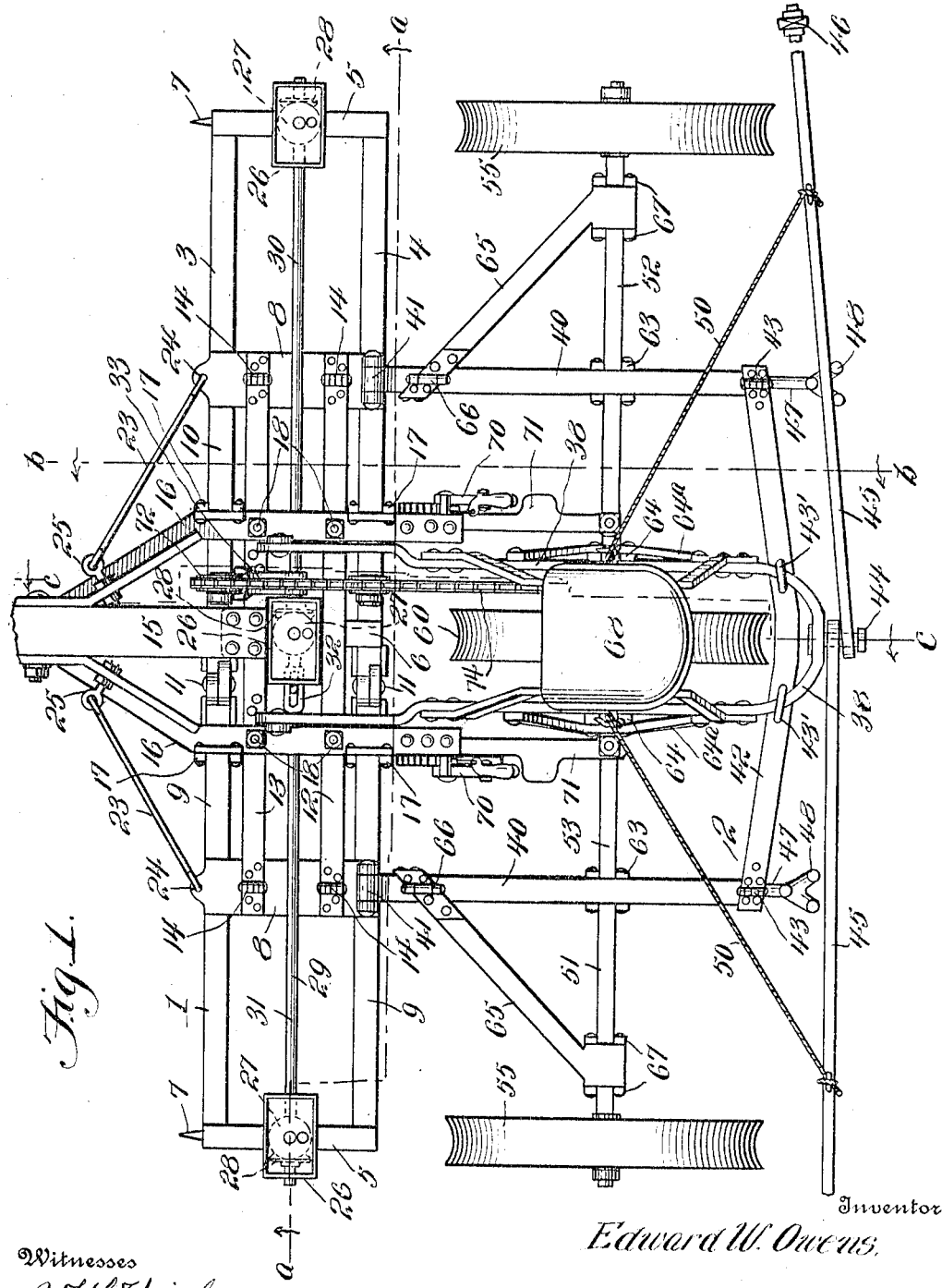

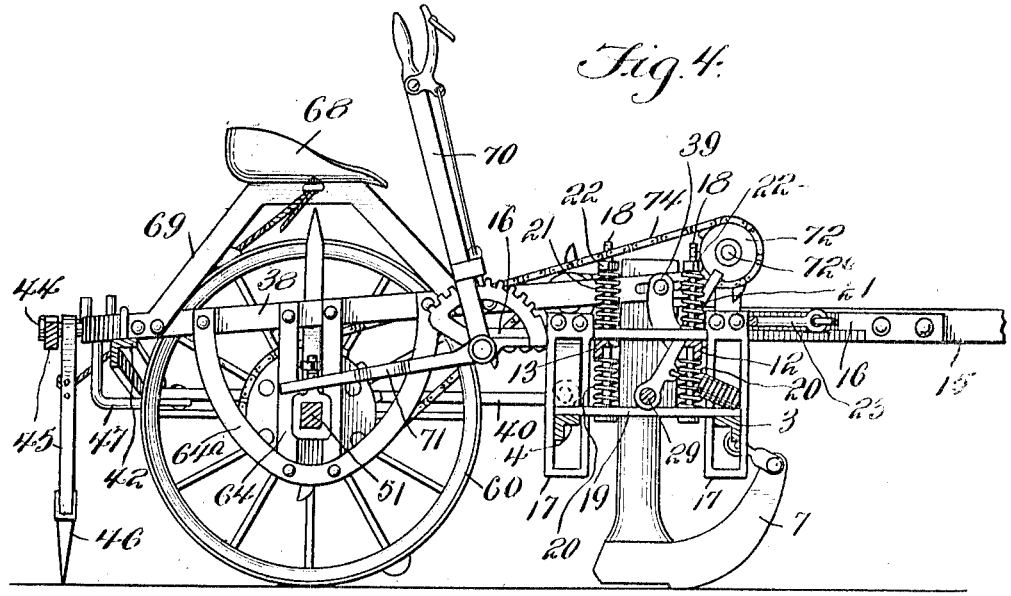
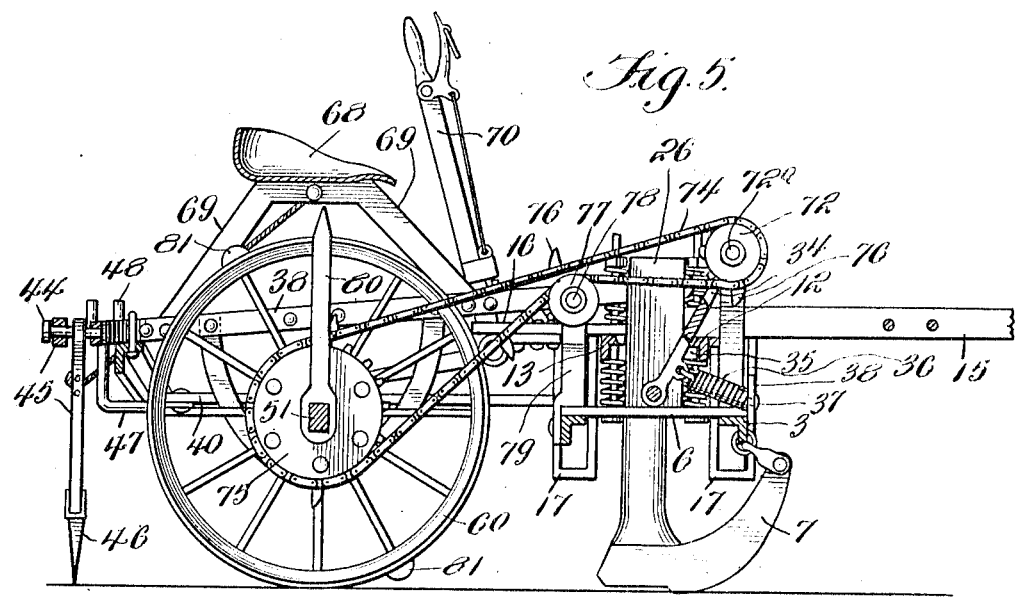

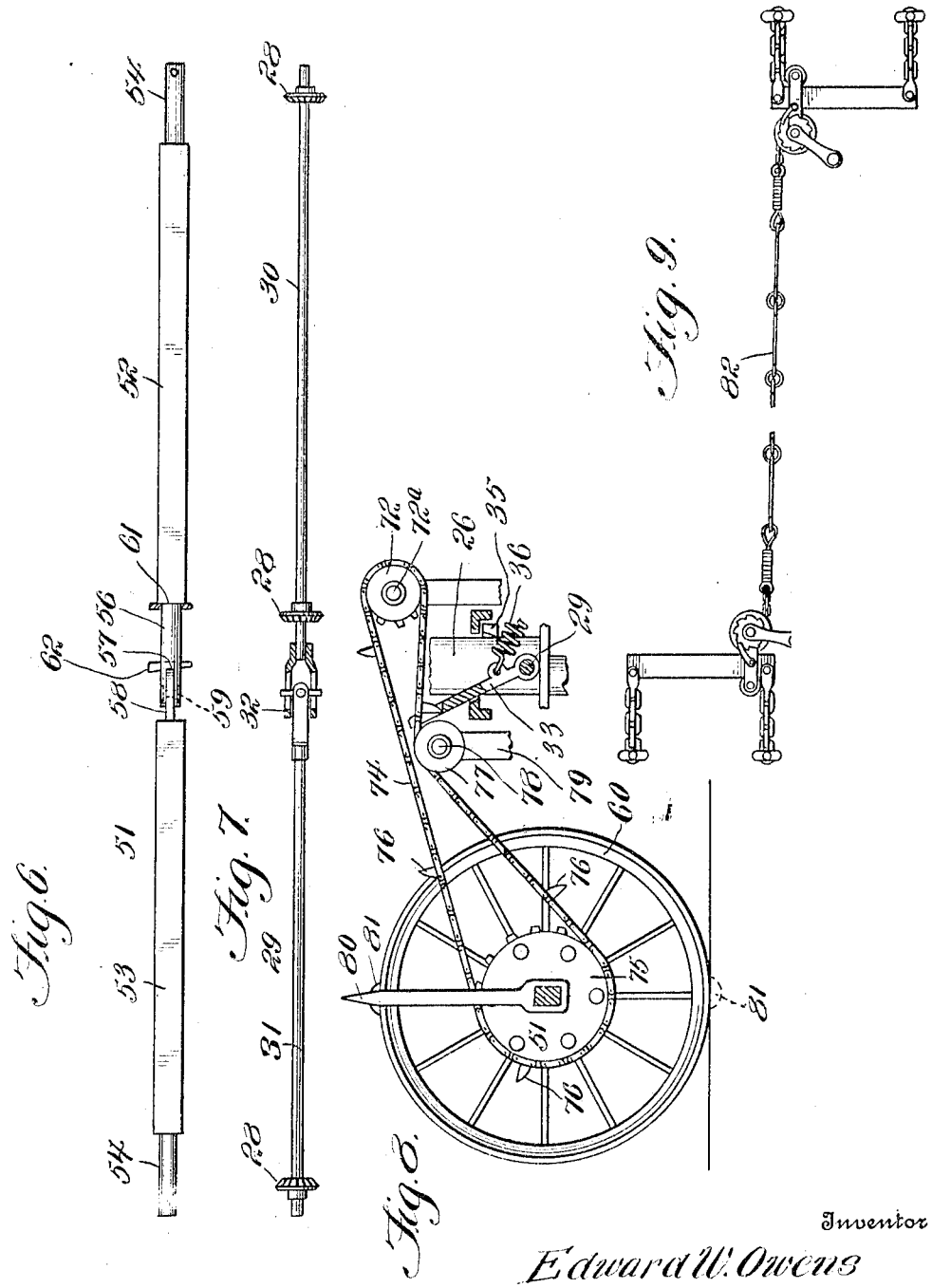

UNITED STATES PATENT OFFICE.

EDWARD W. OWENS, OF WAGNER, SOUTH DAKOTA.

CHECK-ROWER AND AUTOMATIC CORN-PLANTER.

1,090,167.  Specification of Letters Patent.  Patented Mar. 17, 1914.

Application filed September 3, 1912. Serial No. 718,418.

*To all whom it may concern:*

Be it known that I, EDWARD W. OWENS, a citizen of the United States, residing at Wagner, in the county of Charles Mix and the State of South Dakota, have invented certain new and useful Improvements in Check-Rowers and Automatic Corn-Planters; and I do declare the following to be a full, clear, and exact description of the invention, such as will enable others skilled in the art to which it appertains to make and use the same.

This invention is an improved check row corn planter adapted for planting three hills of corn simultaneously in three parallel appropriately spaced rows, and consisting in the construction, combination and arrangement of devices hereinafter described and claimed.

One object of my invention is to effect improvements in the construction of the framework of the planter so that the frame is rendered flexible and its sides or ends and center are adapted for independent vertical movement so that the weight of the machine may be distributed evenly to the three planting and covering mechanisms under all conditions while the machine is at work and thus insure the planting of the corn at the proper depth and adapting the machine to automatically conform to inequalities in the surface of the soil.

Another object is to effect improvements in the construction of the driving means for the seed dropping mechanism, the said improvements embodying a driving shaft carried by the frame and comprising members which are flexibly connected together at a point substantially at the center of the frame to adapt the said shaft to conform to the vertical angular movements of the frame.

Another object of my invention is to combine with the flexible carrier frame on which the seed dropping and furrow opening devices are mounted a trailing frame which is pivotally connected to the carrier frame for vertical angular movement, which is flexible so that its sides or ends and center may be independently vertically moved to conform with corresponding movements of the carrier frame and which also embodies an axle which carries central supporting and carrying wheels, the said axle comprising members flexibly connected together for vertical angular movement.

Another object is to provide improved means for raising and lowering the carrier frame with respect to the trailing frame.

Another object is to provide an improved machine of this type which is adapted for planting three hills of corn simultaneously in check rows and which can be operated by a mechanism carried by the machine or by a check wire stretched across the field.

In the accompanying drawings:—Figure 1 is a plan of a check row corn planter for planting three hills of corn simultaneously and constructed in accordance with my invention. Fig. 2 is a vertical sectional view of the same on the plane indicated by the line *a—a* of Fig. 1 and looking forwardly. Fig. 3 is a rear elevation of the same. Fig. 4 is a vertical longitudinal sectional view of the same on the plane indicated by the line *b—b* of Fig. 1. Fig. 5 is a similar view on the plane indicated by the line *c—c* of Fig. 1. Fig. 6 is a detail plan of the flexibly jointed axle. Fig. 7 is a similar view of the flexibly jointed rock shaft for actuating the seed dropping mechanisms. Fig. 8 is a detail elevation of the automatically operating means, for operating the rock shaft. Fig. 9 is a detail elevation of a check row wire and its anchoring devices for use in connection with the corn planting machine.

My improved check row corn planter comprises a carrier frame 1 on which the seed boxes and the seed dropping mechanism are arranged and a trailer frame 2, the carrier frame being provided with runners or disks 7 for opening the furrows and the trailing frame being provided with an axle 54 and with supporting wheels 55 on the axle and, which serve to cover the seeds dropped in the furrows.

I will first describe the carrier frame.

A pair of bars 3—4 which are arranged parallel with each other are connected together at their ends by cross bars 5 and at their centers by a similar cross bar 6. Under these cross bars are furrow opening runners or shoes 7 which may be of any suitable construction, but if preferred, suitable disks may be substituted for the shoes or runners. The said bars 3—4 are also connected together by a pair of cross bars 8 which are arranged midway between the cross bars 5—6. Each of the bars 3—4 comprises a pair of members 9—10 of unequal length, the members 10 being slightly the longer and the said members being flexible connected together as by means of hinges 11 which are arranged on their upper sides at their joints. This construction of the carrier frame renders the same flexible so that its ends and its center may rise and fall independently of each other and thus adapt the frame to conform to inequalities of the soil.

The cross bars 8 are connected together by front and rear arch bars 12—13 which are spaced apart and the ends of which are connected to the said cross bars 8 by means of hinges 14. The rear end of the pole or tongue 15 is secured on the center of the front arch bar 13. A pair of braces 16 have their front ends secured to opposite sides of the tongue. These braces are angular in form, their front portions converging forwardly and their rear portions being arranged parallel with each other and spaced from opposite sides of the tongue and the said rear portions of the said braces projecting rearwardly of the tongue and bear on and are secured to the front and rear arch bars 12—13. Hence, the said braces are spaced above the front and rear bars 3—4 of the carrier frame 1 and the said braces are connected to the said bars 3—4 by U-shaped standard links 17, the vertical arms of which are secured, as by means of bolts or other suitable devices to the outer sides of the braces, the bars 5 3—4 passing between the vertical arms of the said standard links and being vertically movable therein.

Pairs of vertical guide rods 18 have their lower ends secured to cross bars 19 on the bars 3—4, near the center of the carrier frame, the said guide rods extending upwardly through and being free to move in vertical openings in the arch bars 12—13. Cushioning springs 20, which are here shown as coiled springs, are placed on the said guide rods between the bars 19 and the under sides of the arch bars 12—13 so that their upper ends bear against the said arch bars and counteracting cushioning springs 21 are placed on the upper portions of the said guide rods, their lower ends bearing on the braces 16 and their upper ends being engaged by adjusting nuts 22 which are screwed on the said guide rods. By turning these adjusting nuts, the tension of the cushioning springs 20—21 may be varied as required. The cushioning springs while permitting the carrier frame to flex or bend vertically coact with the arch bars and the braces 16 to support the central portion of the carrier frame and prevent the latter from moving vertically at the center to undue extent and also serve to cushion the central portion of the flexible carrier frame and prevent the latter from vibrating. The front portions of the braces 16 are connected to the front ends of the intermediate cross bars 8 of the carrier frame by means of link rods 23, the rear ends of which are pivotally connected to the carrier frame as at 24 and the front ends of which are connected to the said braces 16 by means of eye bolts 25. The said boxes 26 are mounted on the cross bars at the ends and center of the carrier frame and are provided with suitable seed dropping mechanisms each of which includes a horizontally arranged beveled gear 27 engaged by a vertical beveled gear 28 on a rock shaft 29, the said rock shaft having its bearings in the bases of the seed boxes and comprising a pair of members 30—31 of unequal length, the member 30 being the longer. These members of the rock shaft are connected together by a suitable knuckle 32 which is arranged in line with the pivot axes of the hinges 11 which connect the members of the bars 3—4 of the carrier frame together and the said knuckle while causing the members 30—31 of the rock shaft to rotate together admit of the said rock shaft flexing or bending at the joint between its members to conform to corresponding movements of the carrier frame when the machine is in operation.

A rock arm 33 is attached to the member 30 of the rock shaft 29 at a point to one side of the centrally located seed box and the said rock arm has a fork 34 at its free upper end and constitutes the actuating element of the rock shaft. A stop bar 35 projects from the front side of the centrally located seed box and is arranged in front of the rock arm 33 to limit the forward movement of the latter, a coiled retractile spring 36 being also provided and which has its rear end connected to the rock arm and its front end connected as at 37 to a suitable standard 38 which is secured to and projects upwardly from the front bar 3 of the carrier frame, this spring serving to draw or turn the rock arm forwardly and to correspondingly move or turn the rock shaft 29 in one direction.

I will now describe the trailing frame.

A reach yoke 38, which is substantially and horizontally arranged and which is U-shaped, has the front ends of its arms pivotally connected to and between the upper ends of pairs of blocks 39 which are secured on the upper side of the front arch bar 12 at points equidistant from the center of the same and spaced from opposite sides of the tongue 15. The said reach yoke, thence, extends rearwardly from and its front end is pivotally connected to a member of the carrier frame, so that the said reach yoke is adapted to move angularly in a vertical plane.

A pair of longitudinally arranged side bars 40 have their front ends pivotally connected to the rear portions of the cross bars 8 of the carrier frame as at 41, such pivotal connections admitting of vertical angular movement of said side bars. The rear ends of the side bars are connected together by an arch bar 42 which is similar in construction to the arch bars 12—13 of the carrier frame and the ends of which are connected to the rear ends of the side bars 40 by hinges 43.

The rear portion of the reach yoke extends across and above the center of the arch bar 42 and is connected thereto by vertically arranged clip bolts 43′ which are arranged astride the arms of the reach yoke and admit of slight vertical movement of the reach yoke and the arch bar 42 with respect to each other. From the rear end of the reach yoke projects a suitable pivot element 44 on which the inner ends of a pair of oppositely extending marker arms 45 are pivoted, the said marker arms having suitable markers 46 at their outer ends and being adapted to be raised and lowered at their outer ends and to be also swung forwardly and rearwardly to some extent.

Supporting standards 47 are secured to and project upwardly from the rear portions of the bars 40 and have forks 48 at their upper ends to receive the marker arms when the markers 46 are raised. When the markers are in use at opposite sides of the planter and their arms 45 are in extended transverse position, the markers are held in correct position for operation by means of suitable cords 50 which are connected thereto and which extend forwardly to the frame of the machine and are within reach of the operator, the said cords also enabling the markers to be raised and placed in or unshipped from the supporting forks 48, as will be understood.

A supporting axle 51, which is non-revoluble and which is preferably rectangular in cross section, comprises a pair of members 52—53 of unequal length, the member 52 being the longer. Each member has a spindle 54 at its outer end on which an outer covering and supporting or ground wheel 55 is mounted for rotation. The member 52 is also provided with a spindle 56 at its inner end, at a point corresponding with the center of the axle, as a whole, and this spindle 56 is provided at its outer end with a vertical notch or recess 57 which receives a tongue 58 which projects from the inner end of the member 53, the said tongue being pivotally connected to the spindle 56 by a horizontally arranged pivot bolt 59. Hence, the members of the supporting axle are pivotally connected together at a point near but to one side of the center of the axle for vertical angular movement. A centrally arranged covering and supporting wheel 60 is mounted for rotation on the spindle 56 and when in use bears against the shoulder 61 of the axle member 52 and is held in place by a linch pin 62. When the said linch pin has been removed, the said wheel may be moved to one side over the knuckle or pivot joint between the members 52—53, to enable the spindle 56 to be greased, after which the said wheel 60 is then moved to its initial position and the linch pin reinserted to keep it when in such position and yet permit it to rotate on the spindle 56.

The knuckle or pivotal joint between the members of the supporting axle is in line with the pivotal or knuckle joints between the bars 3—4 of the carrier frame and the members 30—31 of the rock shaft 29 so that the supporting axle of the trailing frame is adapted to flex correspondingly with the carrier frame. The members of the supporting axle are secured to the under sides of the bars 40 of the trailing frame by means of U-shaped links 63, the arms of which engage the flat vertical sides of the members of the axle and the upper ends of which are bolted to the sides of the said side bars 40. The axle members are also engaged by U-shaped vertically arranged links and guides 64 the upper ends of the arms of which are bolted to the sides of the reach yoke 38 and, hence, the middle portion of the axle is adapted to move vertically with respect to the reach yoke. The braces 64ª are provided for the links and guides.

A pair of obliquely arranged rearwardly diverging braces 65 have their front ends connected to the side bars 40 as by means of hinges 66 which permit vertical angular movement of said braces. The outer, rear ends of the braces bear on the upper sides of the members of the axle, near their outer ends and are secured thereon and thereby by means of U-shaped clip bolts or links 67.

A seat 68 for the driver, is arranged above the center supporting and covering wheel 60 and is supported by the upwardly converging legs or supports 69 the lower ends of which are secured to the sides of the reach yoke 38. Hence, the weight of the driver is imposed on the trailing frame at a point directly above the center supporting and covering wheel and is distributed by the reach yoke, the arch bar 42 and the side bars 40 to the members of the supporting axle at points about midway between the side wheels 55 and the center wheel 60.

To raise or lower the runners or disks carried by the carrier, I provide a pair of levers 70 which are fulcrumed at the rear ends of the braces 16 and are provided with foot rests or treadles 71. The foot rests or treadles are, respectively, secured to the members 52—53 of the axle at points equidistant from and near the wheel 60. The operator, by using his feet on the treadles or his hands on the levers can turn the latter and cause them to raise or lower the braces 16, and hence, also the rear end of the tongue, and the carrier frame connected thereto and with its runners and seed dropping mechanisms and thus enable the runners to be operated at any desired depth in good soil according to the depth at which it is desired to plant the seeds.

I will now describe the means for actuating the rock arm 33 and, hence, also the rock shaft 29 which actuates the seed dropping mechanisms.

A sprocket wheel 72 is mounted on a suitably fixed stub shaft 72$^a$ at a point in line with the rock arm 33 and is connected by an endless sprocket chain 74 to a sprocket wheel 75 which is secured to one side of and is revolved by the wheel 60. This sprocket chain is provided at suitably spaced points with outwardly projecting spurs 76. The lower lead of the chain passes between a pair of spaced guide pulleys 77 which are mounted on a suitable stub shaft 78 at the upper end of a standard 79 which projects upwardly from the bar 4 of the carrier frame. The lower lead of the chain is also arranged between the arms of the fork of the rock arm 33. The fixed pointer 80 which is vertically arranged is located near and to one side of the wheel 60 and is secured to the axle 51 at its lower end, its upper end projecting above the wheel 60. The said wheel is provided at diametrically opposite points with markers 81. The gears 72—75 are so proportioned and the spaces between the stubs 76 of the chain 74 are of such length that the said spaces indicate the distances between the corn rows and as the seeds are dropped by the seed dropping mechanisms one of the markers 81 may be at the upper side of the wheel 60 in line with the pointer 80 the other marker 81 will be at the lower side of said wheel to make a mark in the soil and one of the spurs 76 will be just in front of and in position to immediately engage the rock arm 33. Hence, by appropriately turning the wheel 60 and causing one of its markers 81 to coincide with the line of hills planted at one end of a field, the machine can be primarily adjusted so as to cause all the hills to be planted in exact check rows, as will be understood. The machine being then started in operation, the shaft 29 is caused to make a partial rotation rearwardly as the rock arm 33 is turned rearwardly by each of the spurs 76 of the chains 74 in succession, and as each spur passes beyond and from the upper end or fork of the rock arm, the latter is suddenly turned forwardly, together with the rock shaft 29 by the action of the spring 36, the forward movement of the rock arm being determined by the stop 35. At each forward stroke of the rock arm, the seeds are dropped by the seed dropping mechanisms into the furrows made by the runners or disks and in exact check rows.

If preferred, the wheels 72—75 and the chains 74 may be removed or dispensed with and the rock arm 33 operated by a wire 82 stretched across the field and anchored at its ends by anchoring and adjusting devices such as indicated in Fig. 9.

I claim:—

1. A planter of the class described comprising a carrier frame having seed dropping mechanism and furrow openers and a trailing frame connected to and extending rearwardly from the carrier frame and provided with supporting wheels, the said carrier frame and trailing frame being flexible to enable their ends and centers to be independently and vertically moved.

2. A planter of the class described comprising a carrier frame, having seed dropping mechanism and furrow opening elements and comprising members flexibly connected together for independent vertical movement of the ends and center of said carrier frame and a trailing frame connected to and extending rearwardly from the carrier frame and having supporting wheels, the said trailing frame comprising flexibly connected members adapting the center and ends of the trailing frame to be independently and vertically moved.

3. A planter of the class described comprising a carrier frame comprising members flexibly connected together at points intermediate the ends of said carrier frame for independent vertical angular movement, said carrier frame having seed dropping mechanisms and furrow opening elements at its ends and center, a trailing frame arranged in rear of and connected to the carrier frame, and comprising members flexibly connected together for independent vertical angular movement at the ends and center and supporting and covering wheels mounted at the sides and at the center of said trailing frame.

4. A planter of the class described comprising a carrier frame comprising members flexibly connected together for independent vertical angular movement, said carrier frame having seed dropping mechanisms and furrow opening elements at its ends and center, a trailing frame arranged in rear of and connected to the carrier frame, and comprising members flexibly connected together for independent vertical angular movement at the ends and center and supporting and covering wheels mounted at the sides and at the center of said trailing frame, a draft element attached to the central portion of the carrier frame, and means to raise and lower the said carrier frame independently of the trailing frame.

5. A planter of the class described comprising a carrier frame having members flexibly connected together at a point substantially at the center of said carrier frame for angular vertical movement, a reach element having its front end pivotally connected to the carrier frame for vertical angular movement, said reach element extending rearwardly from the carrier frame, seed dropping mechanisms at the ends and center of the carrier frame, an actuating shaft for said seed dropping mechanisms and comprising members flexibly connected together at a point substantially at the center of said frame; a trailing frame for vertical angular movement and extending rearwardly from the carrier frame, an arch bar connecting the rear ends of the said side bars and flexibly connected thereto, an axle comprising a pair of members connected together at a point intermediate the ends of the axle for angular vertical movement, connections between the axle members, the said side bars and the reach element, said connections admitting of independent vertical movement between said axle members and said reach element, side supporting and covering wheels at the ends of the axle and a center supporting and covering wheel at the center of the axle, and means to raise and lower the carrier frame with reference to the trailing frame.

6. A planter of the class described comprising a carrier frame having members flexibly connected together at a point substantially at the center of said carrier frame for angular vertical movement, a reach element having its front end pivotally connected to the carrier frame for vertical angular movement, said reach element extending rearwardly from the carrier frame, seed dropping mechanisms at the ends and center of the carrier frame, an actuating shaft for said seed dropping mechanisms and comprising members flexibly connected together at a point substantially at the center of said frame; a trailing frame for vertical angular movement and extending rearwardly from the carrier frame, an arch bar connecting the rear ends of the said side bars and flexibly connected thereto, an axle comprising a pair of members connected together at a point intermediate the ends of the axle for angular vertical movement, connections between the axle members, the said side bars and the reach element, said connections admitting of independent vertical movement between said axle members and said reach element, side supporting and covering wheels at the ends of the axle and a center supporting and covering wheel at the center of the axle, a draft element connected to the center of the carrier frame and connections including levers between the draft element and the axle members to raise and lower the carrier frame independently of the trailing device.

In testimony whereof I affix my signature in the presence of two witnesses.

EDWARD W. OWENS.

Witnesses:
  AMOS C. JAMES,
  JOHN J. MAWHINEY.

---

Copies of this patent may be obtained for five cents each, by addressing the "Commissioner of Patents, Washington, D. C."